United States Patent
Hayes

(10) Patent No.: US 9,430,128 B2
(45) Date of Patent: Aug. 30, 2016

(54) METHOD AND APPARATUS FOR CONTROLS BASED ON CONCURRENT GESTURES

(75) Inventor: Robin Hayes, Castro Valley, CA (US)

(73) Assignee: TiVo, Inc., Alviso, CA (US)

( * ) Notice: Subject to any disclaimer, the term of this patent is extended or adjusted under 35 U.S.C. 154(b) by 468 days.

(21) Appl. No.: 12/986,060

(22) Filed: Jan. 6, 2011

(65) Prior Publication Data

US 2012/0179970 A1    Jul. 12, 2012

(51) Int. Cl.
*G06F 3/0484* (2013.01)
*G06F 3/0488* (2013.01)
*G06F 3/0482* (2013.01)
*G06F 3/01* (2006.01)

(52) U.S. Cl.
CPC ........... *G06F 3/04842* (2013.01); *G06F 3/017* (2013.01); *G06F 3/0482* (2013.01); *G06F 3/0488* (2013.01); *G06F 3/04883* (2013.01)

(58) Field of Classification Search
CPC .. G06F 3/04883; G06F 3/0488; G06F 3/017; G06F 3/0482; G06F 3/04842; H04N 5/4401
USPC ............................ 715/722; 345/173; 340/3.1
See application file for complete search history.

(56) References Cited

U.S. PATENT DOCUMENTS

| | | | |
|---|---|---|---|
| 5,347,295 A | 9/1994 | Agulnick et al. | |
| 5,566,248 A | 10/1996 | Ulrich | |
| 6,182,287 B1 * | 1/2001 | Schneidewend et al. | 725/48 |
| 6,396,523 B1 | 5/2002 | Segal et al. | |
| 7,479,943 B1 | 1/2009 | Lunsford et al. | |
| 2005/0164633 A1 * | 7/2005 | Linjama et al. | 455/41.2 |
| 2006/0242607 A1 | 10/2006 | Hudson | |
| 2007/0127887 A1 * | 6/2007 | Yap et al. | 386/95 |
| 2007/0177803 A1 | 8/2007 | Elias et al. | |
| 2007/0177804 A1 * | 8/2007 | Elias et al. | 382/188 |
| 2008/0084400 A1 | 4/2008 | Rosenberg | |
| 2008/0165140 A1 * | 7/2008 | Christie et al. | 345/173 |
| 2008/0165141 A1 | 7/2008 | Christie | |
| 2008/0225013 A1 | 9/2008 | Muylkens et al. | |
| 2009/0153288 A1 * | 6/2009 | Hope et al. | 340/3.1 |
| 2009/0156251 A1 | 6/2009 | Cannistraro et al. | |
| 2009/0174677 A1 | 7/2009 | Gehani et al. | |
| 2009/0179867 A1 | 7/2009 | Shim et al. | |
| 2009/0278806 A1 | 11/2009 | Duarte et al. | |
| 2010/0101872 A1 * | 4/2010 | Ikeda et al. | 178/18.01 |
| 2010/0313125 A1 * | 12/2010 | Fleizach et al. | 715/702 |
| 2010/0315358 A1 | 12/2010 | Chang et al. | |

(Continued)

FOREIGN PATENT DOCUMENTS

| | | |
|---|---|---|
| JP | 2001-325071 | 11/2001 |
| JP | 2010-108011 | 5/2010 |

(Continued)

OTHER PUBLICATIONS

U.S. Appl. No. 12/986,054, filed Jan. 6, 2011, Office Action, Aug. 24, 2012.

(Continued)

*Primary Examiner* — Li Sun
(74) *Attorney, Agent, or Firm* — Wong & Rees LLP

(57) ABSTRACT

In an embodiment, a number of parallel gestures are detected, in a particular area on a touch screen interface of a device. A command is identified based at least on the parallel gestures and an action associated with the command is performed.

34 Claims, 4 Drawing Sheets

(56) References Cited

U.S. PATENT DOCUMENTS

| | | |
|---|---|---|
| 2011/0090407 A1* | 4/2011 | Friedman .................. 348/734 |
| 2011/0122081 A1 | 5/2011 | Kushler |
| 2011/0191675 A1 | 8/2011 | Kauranen |
| 2011/0285658 A1 | 11/2011 | Homma et al. |
| 2015/0058729 A1 | 2/2015 | Hayes |

FOREIGN PATENT DOCUMENTS

| | | |
|---|---|---|
| JP | 2010-182046 | 8/2010 |
| JP | 2010-532143 | 9/2010 |

OTHER PUBLICATIONS

PCT International Searching Authority, International Search Report and Written Opinion, PCT application No. PCT/US2012/020306, dated May 2, 2012, 15 pages.

Claims as of May 2, 2012 in PCT application No. PCT/US2012/020306, 3 pages.

U.S. Appl. No. 12/986,054, filed Jan. 6, 2011, Office Action, May 5, 2014.

Japan Patent Office, "Notification of Reasons for Rejection", in application No. 2013-548535, dated Jun. 24, 2014, 2 pages.

Current Claims in Japan application np. 2013-548535, dated Jun. 2014, 6 pages.

Japanese Patent Office, Application No. 2013-548535, Foreign Office Action dated Feb. 3, 2015.

Japanese Patent Office, Application No. 2013-548535, Pending Claims as of Feb. 3, 2015.

Apple Updates Remote Appl With iPad and Retina Display Support.

U.S. Appl. No. 12/986,054, Final Office Action dated Dec. 4, 2014.

Chinese Patent Office, Application No. 2012800047685, Foreign Office Action dated Jul. 3, 2015.

Chinese Patent Office, Application No. 2012800047685, Pending Claims as of Jul. 3, 2015.

Japanese Patent Office, Application No. 2013-548535, Foreign Office Action dated Jul. 7, 2015.

Japanese Patent Office, Application No. 2013-548535, Pending Claims as of Jul. 7, 2015.

U.S. Appl. No. 12/986,054, Advisory Action dated Apr. 9, 2015.

U.S. Appl. No. 12/986,054, Non-Final Office Action dated Sep. 21, 2015.

* cited by examiner

METHOD AND APPARATUS FOR CONTROLS BASED ON CONCURRENT GESTURES

RELATED APPLICATIONS

This application is related to application Ser. No. 12/986,054 filed on Jan. 6, 2011 and titled "Method and Apparatus for Gesture-Based Controls."

FIELD OF THE INVENTION

The present invention relates to the use of gestures. Specifically, the invention relates to gesture-based controls for multimedia content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Multimedia content such as web pages, images, video, slides, text, graphics, sound files, audio/video files etc. may be displayed or played on devices. Commands related to playing or displaying of content on devices may be submitted by a user on the device itself or on a separate device functioning as a remote control.

For example, a user may select a button on a remote control to play, pause, stop, rewind, or fast-forward a video being displayed on a television.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
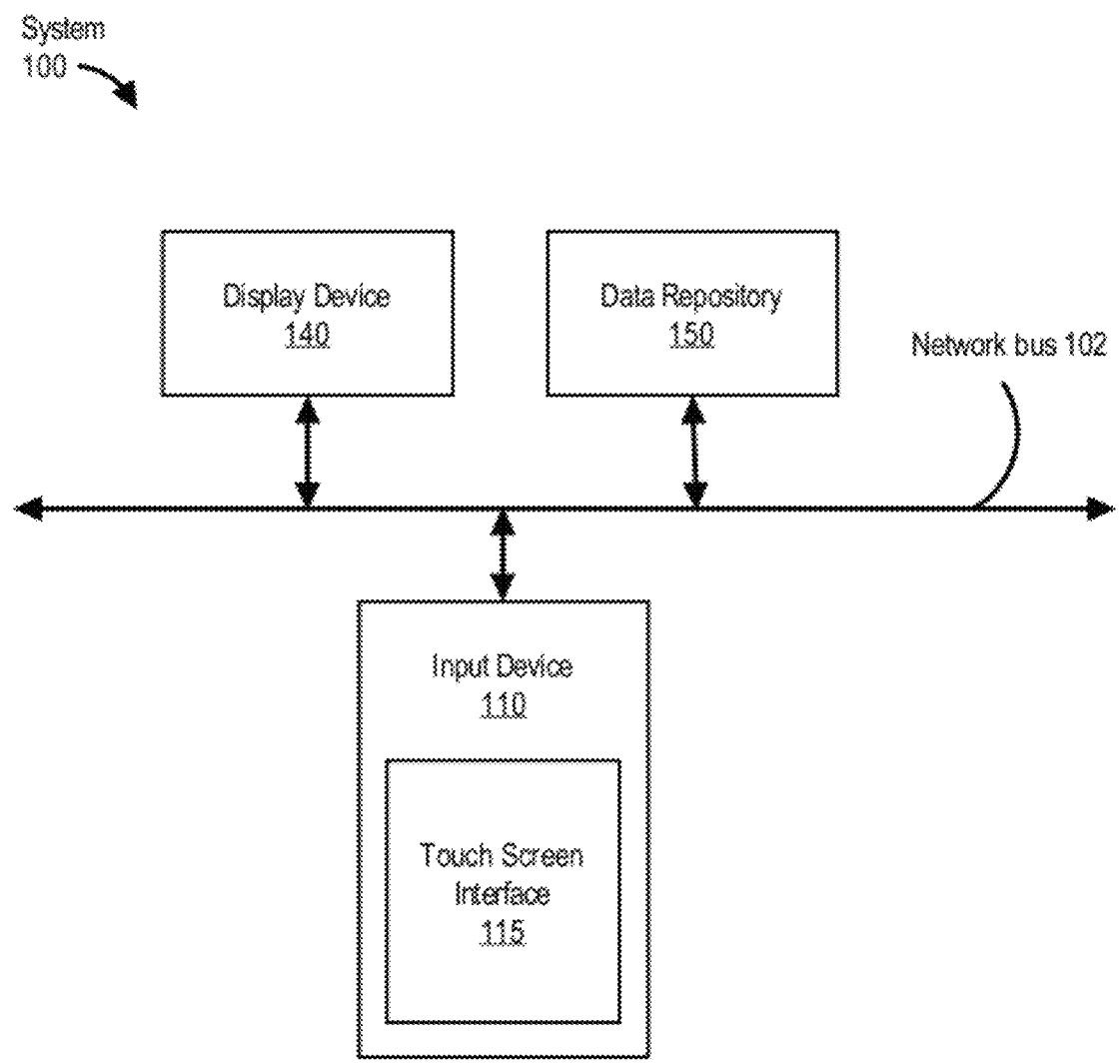
FIG. 1 is a block diagram illustrating an example system in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 OVERVIEW
2.0 SYSTEM ARCHITECTURE
3.0 GESTURES
4.0 GESTURE AREA(S)
5.0 COMMANDS
6.0 DETECTING A GESTURE WITHIN A GESTURE AREA
7.0 EXAMPLE GESTURES AND COMMANDS
8.0 REMOTE CONTROL USE EXAMPLES
9.0 EXAMPLE EMBODIMENTS
10.0 HARDWARE OVERVIEW
11.0 EXTENSIONS AND ALTERNATIVES

1.0 Overview

In an embodiment, a gesture is detected in a particular area of a touch screen interface on a device. The gesture may not necessarily select or move any visual objects within the particular area. For example, the gesture may be detected in a blank box, on top of a video, on top of instructional information for performing gestures, etc. A video playback command associated with the gesture may be identified, and an action corresponding to the video playback command may be determined. The action may then be performed on the same device that detects the gesture. The action may be performed on a different device that is communicatively coupled with the device that detects the gesture.

In an embodiment, multiple input instruments (e.g., multiple fingers) may be used concurrently to perform parallel or identical gestures on a touch screen interface. Based on the number of gestures that are detected, an action may be selected. For example, the number of gestures may also be used to select a particular item from a menu or may be used to identify a command.

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

2.0 System Architecture

Although a specific computer architecture is described herein, other embodiments of the invention are applicable to any architecture that can be used to perform the functions described herein.

FIG. 1 is a block diagram illustrating an example system (100) in accordance with one or more embodiments. The example system (100) includes one or more components that function as content sources, touch screen interface devices, multimedia devices (e.g., devices that play audio and/or video content), and/or content management devices. Specific components are presented to clarify the functionalities described herein and may not be necessary to implement one or more embodiments. Each of these components are presented to clarify the functionalities described herein and may not be necessary to implement one or more embodiments.

Components not shown in FIG. 1 may also be used to perform the functionalities described herein. Functionalities described as performed by one component may instead be performed by another component.

An example system (100) may include one or more of: an input device (110), a multimedia device (140), and a data repository (150). One or more devices shown herein may be combined into a single device or further divided into multiple devices. For example, the input device (110) and the multimedia device (140) may be implemented in a single device. The multimedia device (140) may be configured to play audio and/or video content. The multimedia device (140) may be configured to display one or more still images. In another example, an input device (110) may be used as a remote control detecting gesture-based commands related to content being displayed on a separate multimedia device (140). The input device (110) may communicate directly with the multimedia device (140) or may communicate with an intermediate device (not shown). The intermediate device may, for example, function as a content source for the multimedia device (140) or a media management device. A network bus (102) connecting all components within the system (100) is shown for clarity. The network bus (102) may represent any local network, intranet, Internet, etc. The network bus (102) may include wired and/or wireless segments. All components (shown as communicatively coupled) may not necessarily be communicatively coupled to all other components within the system (100).

In an embodiment, input device (110) may include a touch screen interface (115) configured to detect one or more gestures, as described herein. Input device (110) may be configured to detect a gesture, a path of a gesture, a speed of a gesture, an acceleration of the gesture, a direction of a gesture, etc.

In one example, input device (110) may include a resistive system where an electrical current runs through two layers which make contact at spots/areas on the touch screen interface (115) that are touched. The coordinates of the contact points or contact spots may be compared to gesture information stored in a data repository (150) to identify a gesture performed by a user on the touch screen interface (115). In another example, input device (110) may include a capacitive system with a layer that stores electrical charge, a part of which is transferred to a user where the user touches the touch screen interface (115). In another example, input device (110) may include a surface acoustic wave system with two transducers with an electrical signal being sent from one transducer to another transducer. Any interruption of the electrical signal (e.g., due to a user touch) may be used to detect a contact point on the touch screen interface (115). For example, input device (110) may be configured to first detect that an initial user touch on a visual representation, of the data, displayed on the touch screen interface.

In an embodiment, input device (110) may include hardware configured for receiving data, transmitting data, or otherwise communicating with other devices in the system (100). For example, input device (110) may be configured to detect a gesture performed by a user and perform a video playback action associated with the gesture. In another example, input device (110) may include functionality to transmit information (may be referred to herein as and used interchangeably with "metadata") associated with the gesture. For example, input device (110) may be configured to transmit information comprising a chronological sequence of detected contact points on the touch screen interface (115).

In an embodiment, input device (110) may include one or more of: Read Only Memory (ROM) (206), a Central Processing Unit (CPU), Random Access Memory (RAM), Infrared Control Unit (ICU), a key pad scan, a key pad, Non-Volatile Memory (NVM), one or more microphones, a general purpose input/output (GPIO) interface, a speaker/tweeter, a key transmitter/indicator, a microphone, a radio, an Infrared (IR) blaster, a network card, a display screen, a Radio Frequency (RF) Antenna, a QWERTY keyboard, a network card, network adapter, network interface controller (NIC), network interface card, Local Area Network adapter, Ethernet network card, and/or any other component that can receive information over a network. In an embodiment, input device (110) may be configured to communicate with one or more devices through wired and/or wireless segments. For example, the input device (110) may communicate wirelessly over one or more of: radio waves (e.g., Wi-Fi signal, Bluetooth signal), infrared waves, over any other suitable frequency in the electro-magnetic spectrum, over a network connection (e.g., intranet, internet, world wide web, etc.), or through any other suitable method.

In an embodiment, input device (110) generally represents any device which may be configured for detecting a gesture as user input. A user (includes any operator of input device (110)) may perform a gesture by touching the touch screen interface (115) on the input device (110). For example, a user may perform a gesture by tapping the touch screen interface (115) with a finger or sliding a finger on the touch screen interface (115).

For clarity, examples described herein may refer to a particular input instrument (e.g., a user's finger) to perform gestures. However, any input instrument including, but not limited to, a stylus, a user's finger, a pen, a thimble, etc. may be used to perform gestures in accordance with one or more embodiments.

Gestures relating to touching or making contact with the touch screen interface (115), as referred to herein, may include hovering over a touch screen interface (115) with a finger (or other input instrument) without necessarily touching the touch screen interface (115) such that the touch screen interface (115) detects the finger (e.g., due to transfer of electrical charge at a location on the touch screen interface (115)).

3.0 Gestures

In an embodiment, a tap gesture may be performed by touching a particular location on the touch screen interface (115) and then releasing contact with the touch screen interface (115). A tap gesture may be detected by detecting a contact to a touch screen interface (115) at a particular location followed by detecting that the contact is released.

A tap gesture may refer to a gesture performed using one or more fingers. For example, a two-fingered tap may be performed by using two fingers to concurrently touch two locations on a touch screen interface (115) and thereafter release contact with the touch screen interface (115). A two-fingered tap may be detected by concurrently detecting contact at two locations on the touch screen interface (115) followed by a release of the contact.

In an embodiment, a slide gesture may include any motion in which a user slides one or more fingers on the surface of the touch screen interface (115). Examples of a slide gesture include flick gestures, swipe gestures, or gestures involving moving a finger along any path on the touch screen interface (115). The path may be closed shape such as a circle or square where the start and end points are the same or an open shape such as a right angle where the start and end points are different. Examples of paths include, but are not limited to, a straight line, a curved line, a circle, a square, a triangle, an angle, etc.

In an embodiment, a flick gesture may be performed by touching a particular location on the touch screen interface (115) of the input device (110) with a finger (or any other item, e.g., a stylus), and sliding the finger away from the particular location while maintaining contact with the touch screen interface (115) for a portion of the sliding action performed by the user and continuing the sliding action even after contact with the touch screen interface (115) has ended. In an embodiment, the touch screen interface (115) may be configured to detect the proximity of the finger after physical contact with the touch screen interface (115) has ended.

For example, the user may release contact with the touch screen interface (115) while still moving the finger in the direction of the sliding action even though additional surface area of the touch screen interface (115), in the direction of the sliding action, may be available to continue the sliding action while maintaining contact.

In another example, a flick gesture may involve a user touching a particular location on the touch screen interface (115) of input device (110) and then sliding the finger, while maintaining contact with the touch screen interface (115), beyond the edge of the touch screen interface (115). Accordingly, the user may maintain contact with the touch screen interface (115) (e.g., with a finger) until the finger reaches the edge of the touch screen interface (115) and continue a motion in the same direction past the edge of the touch screen interface (115).

A user performing a flick gesture may continue the sliding action after releasing contact with the touch screen interface (115). Input device (110) may detect that contact between a finger and the touch screen interface (115) was released as the finger was still moving based on a duration of contact with the touch screen interface at the last contact point. The detected release while the finger is moving may be determined to be a flick gesture.

In an embodiment, a swipe gesture may be performed by touching a particular location on the touch screen interface (115) of the input device (110) with a finger and sliding the finger away from the particular location while maintaining contact with the touch screen interface (115) during the sliding action.

In another example, a user may slide a finger along the touch screen interface (115) from a first location to a second location and thereafter stop by maintaining contact with the second location for a threshold period of time (e.g., one second). The detected continued contact with the second location may be used to determine that the user has completed a swipe gesture.

In an embodiment, a sliding action (e.g., a swipe or a flick) may be detected before the sliding action is completed. For example, a right-direction sliding gesture may be detected by detecting contact at a first location followed by contact at a second location that is to the right of the first location (or within a particular degree in the right direction). The user may continue the sliding gesture to a third location that is right of the second location, however, the direction of the sliding gesture may already be detected using the first location and the second location.

In an embodiment, a flick gesture and a slide gesture (e.g., in the same direction) may be mapped to the same video playback command. Accordingly, a device may be configured to detect either of the slide gesture or the flick gesture and identify the same video playback command in response to the detected flick gesture or slide gesture.

In an embodiment, a flick gesture and a slide gesture (possibly in the same direction) may be mapped to different commands. For example, a flick gesture to the left may correspond to a twenty second rewind command and a swipe gesture to the left may correspond to a command for selecting the previous bookmarked scene in a video. A scene may be bookmarked, for example, by a user or hard coded into a media recording such as selectable scenes from a movie recorded on a Digital Video Disc (DVD).

In an embodiment, a slide gesture may be performed with multiple input instruments being used concurrently. For example, a user may slide two fingers across a touch screen interface at the same time. Further the user may concurrently slide the two fingers in parallel (e.g., sliding two fingers in the same direction from left to right).

The term concurrently has referred to herein includes approximately concurrent. For example, two fingers concurrently performing a parallel gesture may refer to two fingers of different lengths performing the same gesture at slightly different times. For example, one finger may lag in time behind another finger for starting and/or finishing the gesture. Accordingly, the two fingers may start and finish the gesture at different start and/or finish times.

The term parallel as referred to herein include paths that are in approximately the same direction. Two fingers performing a parallel motion, as referred to herein, include a user dragging two fingers across a touch screen interface in the same direction. Due to a difference in the length of the fingers or due to an angle of the hand, two or more fingers performing a parallel motion in the same general direction may differ in direction by a few degrees. In an embodiment, the paths along which two parallel gestures are performed may overlap. The term parallel, as referred to herein, may refer to any set of two or more gestures that are performed in the same general direction.

4.0 Gesture Area(s)

In an embodiment, the touch screen interface (115) includes a gesture area. A gesture area is at least a portion of the touch screen interface (115) that is configured to detect a gesture performed a user. The gesture area may include the entire touch screen interface (115) or a portion of the touch screen interface (115). The gesture area may display a blank box or one or more items. For example, the gesture area may display a video. In another example, the gesture area may display information on how to perform gestures.

In an embodiment, a gesture may be detected within a gesture area without a user's interaction with any visual objects that may be displayed in the gesture area. For example, a swipe gesture across a cellular phone's touch screen interface (115) may be detected in a gesture area that is an empty box on the touch screen interface. In another example, a progress indicator displayed in the gesture area is not touched by a detected swipe gesture associated with a rewind command.

In an embodiment, any visual objects displayed within the gesture area are not necessary for detecting a gesture or determining a command related to the gesture. In an embodiment, any visual objects displayed within the gesture area are not selected or dragged by a finger performing the gesture.

In an embodiment, the touch screen interface (115) may include multiple gesture areas. A gesture detected within one gesture area may be mapped to a different command than the same gestured performed in a different gesture area. A device may be configured to identify an area in which a gesture is performed and determine an action based on the gesture and the gesture area in which the action was performed.

In an embodiment, the gesture area of multiple gesture areas may be selected by a device when a gesture is detected across multiple gesture areas. The gesture area in which the gesture area was initiated may be identified as the selected gesture area. For example, a user may begin a swipe gesture in a first gesture area and end the swipe gesture in a second gesture area. In response to detecting that the swipe gesture was initiated in the first gesture area, the command mapped to the gesture and the first gesture area may be selected. In another example, a gesture area in which the end of a sliding action is detected may be identified as the intended gesture area. The selected or intended gesture area may be then used to identify a command.

5.0 Commands

In an embodiment, a gesture may be mapped to (or associated with) a command. For example, a command mapped to a gesture may be a video playback command related to the playback of a video. The command may be related to playback of a video on the device on which the command was received or on a different device.

In an embodiment, a command may specify a video playing speed and direction. For example, the command may select rewinding at a particular rewinding speed or fast-forwarding a particular fast-forwarding speed. Examples of other video playback commands include, but are not limited to, pausing the playing of the video, resuming the playing of the video, replaying a played portion of the video, stopping playing of the video, stopping playing of the video and resuming playing of the video at a particular playing position, playing the video in slow motion, frame-stepping through a video, playing the video from the beginning, playing one or more videos from a next playlist, playing the video from a particular scene forward, bookmarking a playing position in the video, stopping playing and resuming playing at a bookmarked position, or rating the video.

In an embodiment, a command may select a particular option out of a list of options. For example, a list of available media content may be displayed on a screen and the command may select particular media content of the available media content. In another example, a list of configuration settings may be displayed and the command may select a particular setting for modification.

6.0 Detecting a Gesture within a Gesture Area

Figure 2:
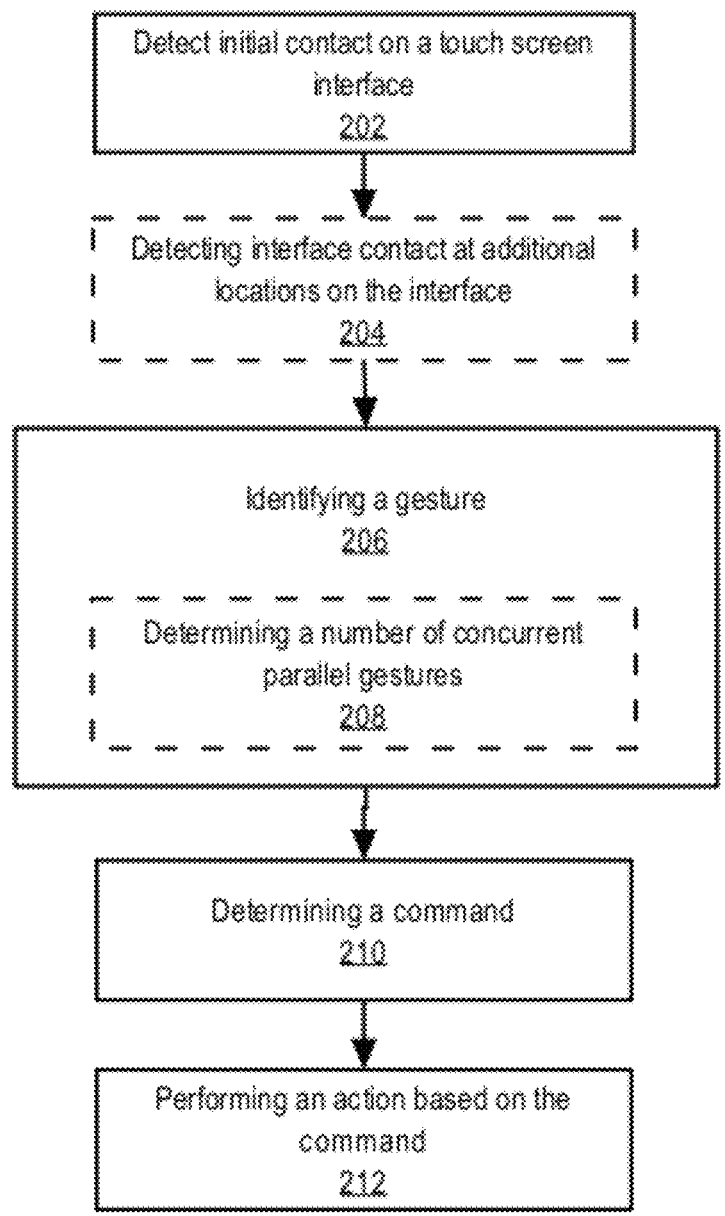
FIG. 2 illustrates a flow diagram for detecting a gesture in accordance with one or more embodiments.

FIG. 2 illustrates a flow diagram for detecting a gesture within a gesture area. One or more of the steps described below may be omitted, repeated, and/or performed in a different order. Accordingly, the specific arrangement of steps shown in FIG. 2 should not be construed as limiting the scope of the invention.

In one or more embodiments, detecting a gesture may include detecting interface contact at an initial location that is a part of the detected gesture (Step 202). The initial contact on the touch screen interface may be made with a user finger, a stylus, or any other item which may be used to perform a gesture on a touch screen interface. The initial contact with the touch screen interface may involve a quick touch at the initial location (e.g., a tap gesture) or a touch that is maintained at the initial location for any period of time (e.g., a millisecond, a second, two seconds, etc.). The initial contact with the touch screen interface may be brief as may be made by a finger already moving in a direction. For example, a finger moving in the air without making contact, and thereafter during the moving making the initial contact with a portion of the touch screen interface.

In an embodiment, the initial contact as referred to herein may include a finger (or other item) being close enough to a touch screen interface that the touch screen interface detects the finger. For example, when using a device including a capacitive system with a layer that stores electrical charge, a part of the electrical charge may be transferred to a user where the user touches the touch screen interface or where a user simply hovers close to the touch screen interface without touching. Accordingly, initial contact or maintained contact as referred to herein may include a user hovering a finger or other item over a touch screen interface.

In an embodiment, the initial contact on the touch screen interface does not select any visual object displayed on touch screen interface. The initial contact may be made when no visual object is displayed. The initial contact may be made on top of a display of a visual object without selecting the visual object. For example, the initial contact may be made on a touch screen interface that is displaying a user-selected background image for the cellular phone. In another example, the initial contact may be made on a blank screen. The initial contact may be detected on a top of a television show being played on a tablet.

In one or more embodiments, detecting a gesture may further include detecting interface contact at additional locations, on the touch screen interface (Step 204). For example, detecting a flick gesture or a swipe gesture may include detecting interface contact at additional locations in a chronological sequence along a path from the initial contact location. For example, interface contact may be detected continuously in a left-direction path away from an initial contact location on the touch screen interface.

The contact along a path away from the location of the initial contact point may be referred to herein as a sliding gesture. In one or more embodiments, a speed of the sliding gesture or a direction of the sliding gesture may be determined. For example, contact at two or more locations on the interface, such as the initial contact point and a second point along the path of the sliding gesture, may be used to determine a direction and/or a speed of the sliding gesture. Contact at multiple points may be used to calculate an acceleration of a sliding gesture.

In one or more embodiments, a gesture may be identified based on contact detected at one or more locations on the touch screen interface (Step 206). For example, detecting concurrent contact at three locations on a remote control interface followed by a release of contact at all three locations may be identified as a three finger tap gesture. In an embodiment, detecting a gesture may include identifying a path along which contact was detected on the touch screen interface. For example, a circle gesture may be identified in response to detecting contact along a circular path on a touch screen interface. A flick gesture or a swipe gesture may be identified based on contact points in a chronological sequence on a touch screen interface.

In one or more embodiments, identifying a gesture may include determining a number of concurrent parallel gestures (Step 208). For example, initial contact may be detected concurrently at multiple locations on a touch screen interface. Subsequent to the initial contact at each initial location, contact along paths beginning from the initial locations may be detected. If the paths are determined to be parallel, the number of paths may be identified to determine the number of concurrent parallel gestures.

In an embodiment, a number of concurrent parallel gestures may be determined based on the number of paths that match a known configuration. For example, if a path has at least a first contact point and a subsequent second contact point to the right within ten degrees from a horizontal line from the first contact point, the path may be determined to correspond to a sliding gesture to the right. The number of detected gestures that correspond to paths that match the same criteria within a particular time period may be counted to determine the number of concurrent parallel gestures. In an embodiment, other methods not described herein may be used for determining the number of concurrent parallel gestures.

In an embodiment, a command is determined based on an identified gesture (Step 210). The command may be determined while the gesture is still being performed or after the gesture is completed.

In an embodiment, determining a command may include determining that a particular detected gesture is mapped to a command in a database. For example, a two fingered swipe to the right may be queried in a command database to identify a command associated with the two fingered swipe. In another example, a two fingered flick toward the bottom of the gesture area may be associated with a command for selecting the second menu item out of items currently displayed in a menu.

In an embodiment, a number of parallel fingers in a command may be used to determine a playback speed for the playing of multi-media content. For example, detection of two parallel gestures may be mapped to a command for playback speed which is two times a normal playback speed.

In an embodiment, a direction of gesture command may be combined with a number of parallel fingers in the gesture command to determine the playback command. For example, two fingers swiped concurrently from the right side of the screen to the left side of the screen may be mapped to rewind at two times a normal speed. In another example, two fingers swiped concurrently from the left side of the screen to the right side of the screen may be mapped to fast-forward at a speed that is twice the normal playback speed (without fast-forwarding).

In an embodiment, a command may include resuming playing of a video at particular bookmarks (e.g., user defined bookmarks or manufacturer defined bookmarks). A number of fingers used to perform a concurrent parallel gesture may be used to select the bookmark. For example, in response to detecting a two-fingered flick downward, the playing of a video may be resumed at the second bookmark from a current playing position.

In an embodiment, determining a command may include identifying the device corresponding to the command. For example, a device related to the command may be identified based on the gesture and/or the gesture area in which the gesture was detected.

In an embodiment, an action corresponding to the command is performed (Step 212). The action may be performed by a device that detects the command. For example, if a gesture for a fast-forward command is detected on a hand-held touch screen phone that is playing a video, the hand-held touch screen phone play the video in fast-forward mode.

In an embodiment, an action corresponding to the command may include transmitting information related to the command to another device. For example, a gesture may be detected on a touch screen remote control. Information related to the gesture (e.g., information identifying the gesture or information identifying a command associated with the gesture) may then be transmitted to a digital video disc player. The digital video disc player may then perform a corresponding action. If the command was for pausing the playing of a video, the digital video disc player may pause the playing of the video on a display screen.

7.0 Example Gestures and Commands

Figure 3:
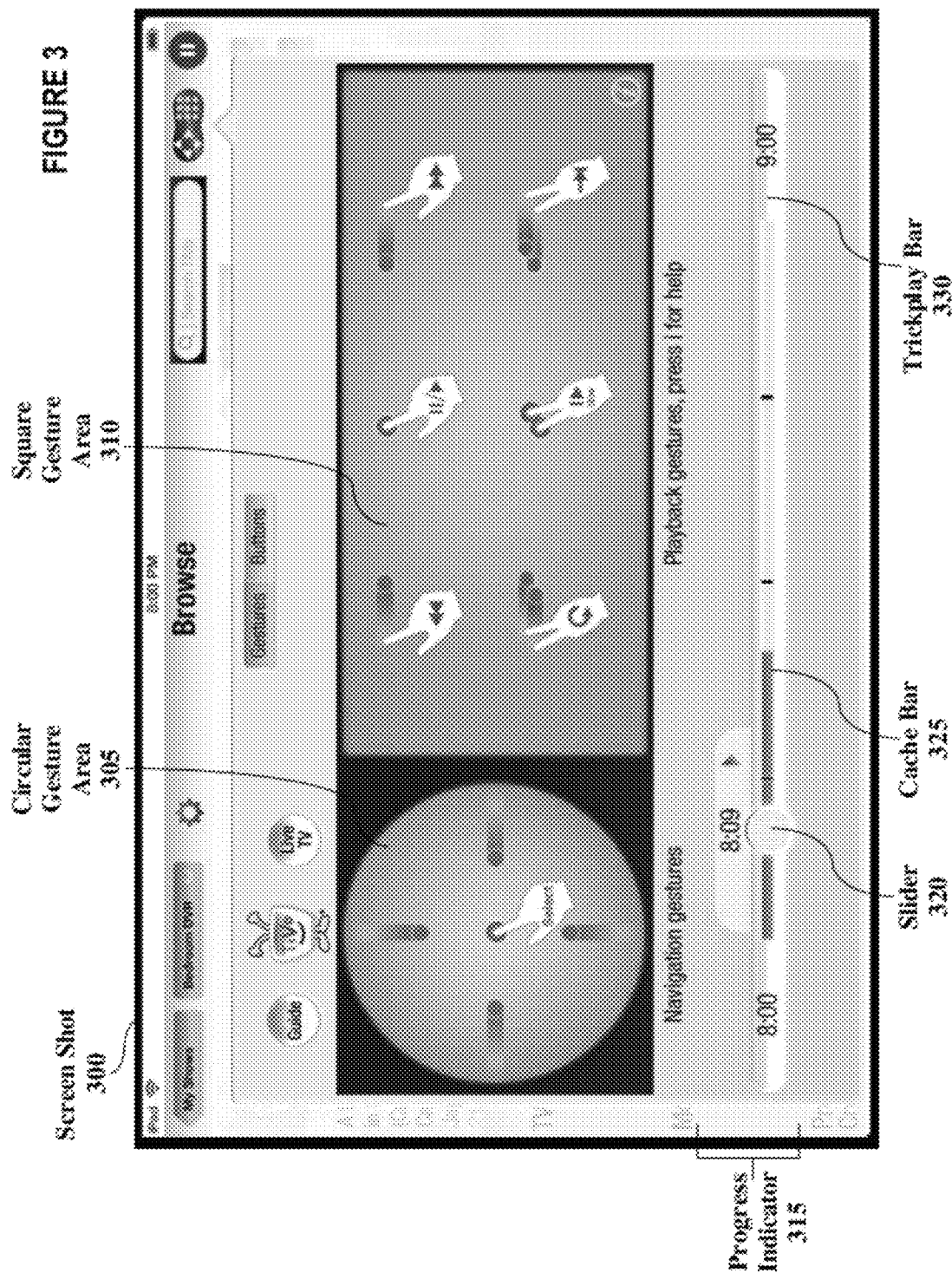
FIG. 3 illustrates an example interface in accordance with one or more embodiments.

FIG. 3 illustrates an example screen shot for an input device configured to detect gestures. The gestures, commands, mapping between gestures and commands, gesture areas, visual objects, and any other items discussed in relation to FIG. 3 are examples and should not be construed as limiting in scope. One or more of the items described in relation to FIG. 3 may not be necessarily implemented and other items described may be implemented in accordance with one or more embodiments.

FIG. 3 illustrates an example interface (300) with a circular gesture area (305) and a square gesture area (310). Any gestures detected in circular gesture area (305) are mapped to navigation commands. For example, a two fingered tap detected in circular gesture area (305) may be associated with a command selecting a second item on any currently displayed menu. If the second item is a folder, the items within the folder may be displayed in response to detecting the two fingered tap.

In an embodiment, square gesture area (310) may identify commands that are associated with one or more gestures detected within the square gesture area (310). For example, the square gesture area (310) may include graphics illustrating that a single finger swipe gesture to the left corresponds to a rewind command, a single finger tap gesture corresponds to a pause command, a single finger swipe gesture to the right corresponds to a fast-forward command, a two fingered swipe gesture to the left corresponds to a ten second rewind, a two fingered tap gesture corresponds to show motion playback command, and a two fingered swipe to the right corresponds to skip to next bookmark command.

In an embodiment, the example interface (300) may include a progress indicator (315) which is separate from the circular gesture area (305) and the square gesture area (310). The progress indicator (315) may include a current playing position of the video, bookmarks, a current playback speed, etc. For example, the progress indicator (315) may include a symbol representing a current playback speed (e.g., play, fast forward at 1×, pause, rewind at 2×, etc.).

In an embodiment, the symbol may be displayed in response to a command. For example, in response to a rewind at 3× command, a symbol indicating 3× rewind may displayed while rewinding multimedia content at 3× is performed by displaying frames in reverse at three times the normal playback speed. However, the progress indicator (315) may not necessarily be selected by any gesture associated with a video playback command. In an embodiment, no visual objects within example interface (300) are necessarily selected when a user is performing a gesture within the example interface (300).

In an embodiment, the example interface (300) may also include a tool (e.g., a drop down box) to select a particular media device to be controlled by detected gestures. In an embodiment, the example interface (300) may include an option to switch between input mechanisms (e.g., gesture based input, buttons, text box, radio boxes, etc.).

8.0 Remote Control Use Example

In an embodiment, a remote control device communicates with a media device (e.g., a digital video recorder, a digital video disc player, a media management device, a video recorder, a blu-ray player, etc.). The remote control device may communicate with the media device over wired and/or wireless communication segments. For example, the remote control device may communicate over a network (e.g, internet, intranet, etc.), via radio communication, over Bluetooth, via infrared, etc.

In an embodiment, a remote control displays a progress indicator (315) as shown in the screen shot (300) of FIG. 3. The progress indicator (315) may indicate a playing position of multimedia content being displayed on a separate multimedia device. The progress indicator (315) may display an exact playing position or an approximate playing position. For example, the progress indicator (315) may include a slider (320) displayed along a trickplay bar (330) to indicate the playing position. In an embodiment, a particular playing position may be indicated by a time (e.g., 8:09). The time may indicate, for example, the actual streaming time of the currently played content or may indicate an offset from the starting point of the content.

In an embodiment, information related to the playing position of the multimedia content may be obtained from a media device (e.g., a digital video recorder, a cable box, a computer, a media management device, a digital video disc player, multimedia player, audio player, etc.). For example, a remote control device communicatively coupled with a media device may be configured to receive frame information related to the particular frame being displayed (played) by the media device. In an embodiment, the media device may periodically send the remote control device the frame information. Alternatively, the remote control device may periodically request the frame information from the media device. The remote device uses the information to position the slider (320) along the trickplay bar (330). The remote control device can also receive information from the media device indicating the extent of the cache bar (325) which indicates the amount of multimedia content stored or recorded by the media device. If the media device is in the process of recording or caching a multimedia content, the cache bar (325) will increase in size as the media device records or caches more content. If the media device is playing a recorded multimedia content, then the cache bar (325) extends the length of the trickplay bar (330).

Another example may involve the remote control device being configured to receive a time stamp closest to the frame being displayed. The remote control device may also be configured to use a step function, e.g., next frame or previous frame from the time stamp if no frame is an exact match to the time stamp. Another example may include the remote control device continuously receiving images (e.g., bitmap, display instructions, etc.) from the media device of the progress indicator to display on the remote control device. In an embodiment, the remote control device may include a particular starting position and a display rate for use by the remote control device to determine the playing position of the multimedia content. For example, a digital video recorder may transmit an initial playing position in the playing of the multimedia content to the remote control device with a rate of progress (e.g., change of the slider (320) per unit of time, frame rate, etc.). The remote control device may use the information to first display a progress indicator based on the initial playing position and may then compute the subsequent positions as a function of time.

In an embodiment, the slider (320) becomes out of sync with a displayed video when a trickplay function is performed (e.g., when a ten second rewind is performed). In response to a trickplay function, updated information regarding a new playing position may be provided to the remote control device.

In an embodiment, the remote control device may further receive updates selecting specific playing positions or indicating changes in the rate of progress. For example, a user may submit one or more commands to pause the playing of multimedia content at a current playing position, then skip back 10 seconds before the current playing position and then resume playing. In this case, a media device may provide information to the remote control device to pause the slider (320), display a new playing position corresponding to 10 seconds before the current playing position by moving the slider (320), and then resume periodically updating the slider (320).

In an embodiment, the slider (320) may be updated when the remote control device is activated. For example, when a user picks up the remote control device or touches the remote control device, the remote control device may request playing position information from a media device. For example, the remote control device may include an accelerometer configured to detect motion and/or a touch screen interface configured to detect touch. In response, the media device may provide playing position information to the remote control device. The remote control device may then display the slider (320) indicating a current playing position of multimedia content based on the playing on the position information received from the media device.

In an embodiment, information related to the playing position of the multimedia content may be continuously received by the remote control device for the remote control device to constantly update the slider (320). In another embodiment, the information related to the playing position of the multimedia content may be periodically received and the remote control device may update the slider each time the information is received.

In an embodiment, the remote control device may transmit the multimedia content to the multimedia device for display by the multimedia device. For example, the remote control device may obtain a video stream over the internet and send the video stream to a multimedia device for display on the multimedia device. In this example, the remote control device may determine the display position of the slider (320) based on playing position information determined by the remote control device itself. For example, the remote control device may compute the playing position information based on a frame being sent to the multimedia device from the remote control device.

9.0 Example Embodiments

In an embodiment, a method comprises detecting a slide gesture, in a particular area on a touch screen interface of a device, from a first location in the particular area to a second location in the particular area; identifying a video playback command based at least on the slide gesture; performing an action associated with the video playback command; wherein the method is performed by at least one device.

In an embodiment, the sliding gesture is detected without detecting selection of any video progress indicator displayed within the particular area. The slide gesture may be detected in the particular area while displaying at least a portion of the video in the particular area. The slide gesture may be detected in the particular area while displaying information on how to perform one or more gestures in the particular area.

In an embodiment, identifying the video playback command is further based on the particular area, in which the slide gesture was detected, from a plurality of areas on the touch screen interface.

In an embodiment, performing the action comprises a first device sending information to a second device, the information based on the video playback command. Performing the action associated with the video may comprise performing the action on a same device as the device detecting the slide gesture. The video playback command may select a playing speed and direction.

In an embodiment, the slide gesture comprises a swipe gesture from the first location to a second location. The slide gesture may comprise a flick gesture starting at the first location.

In an embodiment, the video playback command is for one or more of: pausing the playing of the video; resuming the playing of the video; replaying a played portion of the video; stopping playing of the video; stopping playing of the video and resuming playing of the video at a particular playing position; playing the video in slow motion; playing the video from the beginning; playing one or more videos from a next playlist; playing the video from a particular scene forward; bookmarking a playing position in the video; stopping playing and resuming playing at a bookmarked position; or rating the video.

In an embodiment, a method comprises concurrently detecting a plurality of parallel gestures on a touch screen interface of a device; determining a number of the plurality of parallel gestures; selecting a command from a plurality of commands based on the number of the plurality of parallel gestures; performing an action associated with the command.

In an embodiment, selecting the command comprises selecting a menu option based on the number of the plurality of parallel gestures. The plurality of parallel gestures may comprise a plurality of parallel sliding gestures performed in a same direction.

In an embodiment, determining the number of the plurality of parallel gestures comprises determining a number of tap gestures concurrently performed on the touch screen interface.

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

10.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
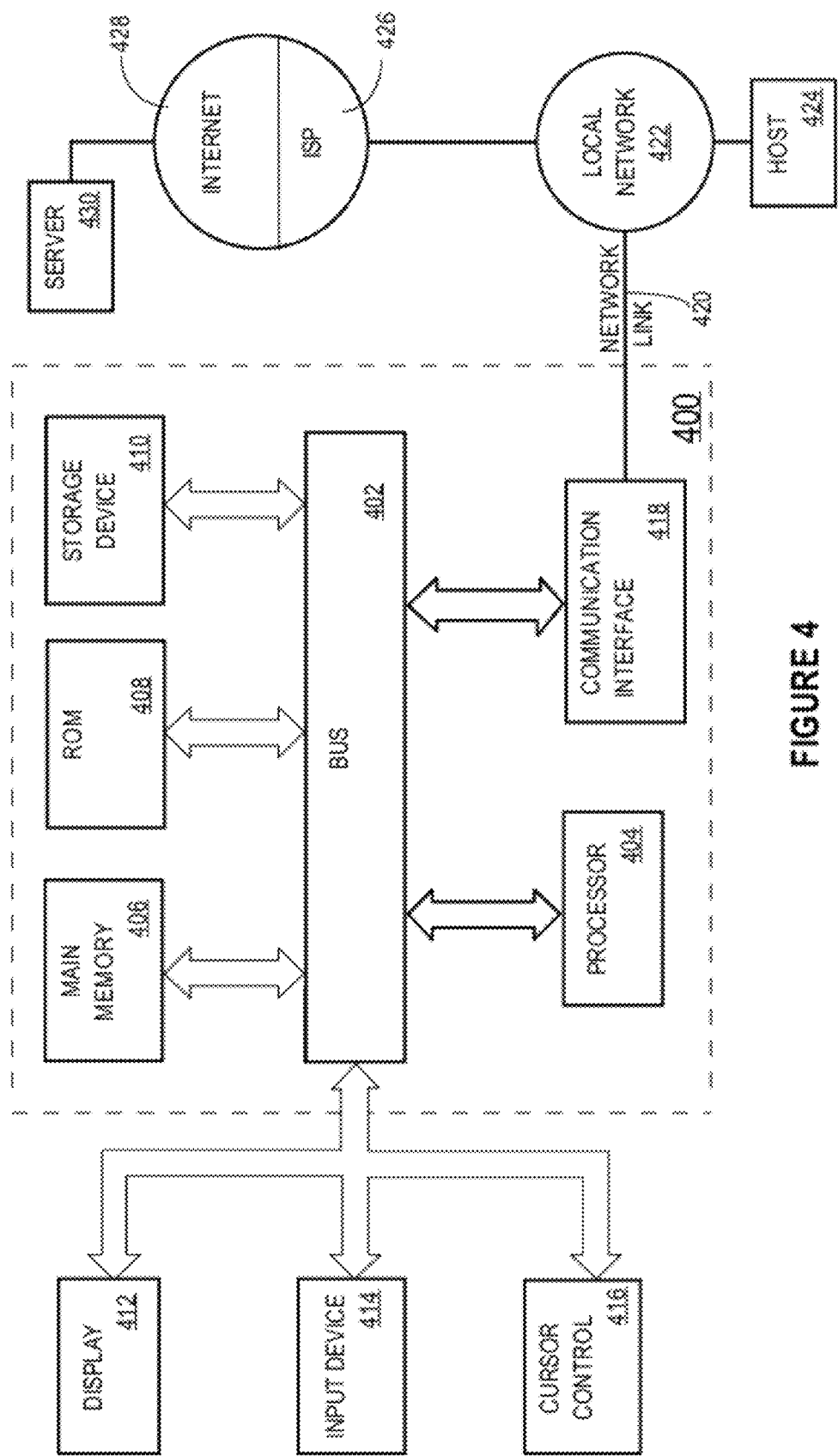
FIG. 4 shows a block diagram that illustrates a system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

The received code may be executed by processor 604 as it is received, and/or stored in storage device 610, or other non-volatile storage for later execution. In an embodiment, an apparatus is a combination of one or more hardware and/or software components described herein. In an embodiment, a subsystem for performing a step is a combination of one or more hardware and/or software components that may be configured to perform the step.

11.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:
1. A method, comprising:
concurrently detecting a plurality of parallel gestures on a touch screen interface of a first device;
determining a number of the plurality of parallel gestures;
responsive to concurrently detecting the plurality of parallel gestures in a first area of the touch screen interface:
  selecting a command from a plurality of commands based on the number of the plurality of parallel gestures, the plurality of commands corresponding to a displayed menu of options each having an option number;
  wherein selecting the command comprises selecting which of the plurality of commands corresponds to a particular option, of the displayed menu of options, that has an option number equivalent to the number of parallel gestures, the displayed menu of options including at least one option corresponding to two parallel gestures and another option corresponding to three parallel gestures; and
  causing performance of the selected command at the first device or at a second device that is communicatively coupled to the first device;
responsive to concurrently detecting the plurality of parallel gestures in a second area of the touch screen interface, the second area being different than the first area:

causing performance of a trick-play command corresponding to the number of the plurality of parallel gestures, with respect to playback of multimedia content at the first device or at the second device that is communicatively coupled to the first device, the trick-play command being different than the plurality of commands corresponding to the menu of options.

2. The method of claim 1, wherein each of the options corresponds to a bookmark in the multimedia content, wherein performance of the selected command comprises playing the multimedia content from a playing position associated with a particular bookmark that corresponds to the particular option.

3. The method of claim 1, wherein the plurality of parallel gestures comprise a plurality of parallel sliding gestures performed in a same direction.

4. The method of claim 1, wherein determining the number of the plurality of parallel gestures comprises determining a number of tap gestures concurrently performed on the touch screen interface.

5. The method of claim 1, wherein causing performance of the selected command comprises causing performance of the selected command at the second device that is communicatively coupled to the first device.

6. The method of claim 1, wherein the selected command is to navigate a folder hierarchy.

7. A method, comprising:
concurrently detecting a plurality of parallel gestures on a touch screen interface of a remote wireless device;
determining a number of the plurality of parallel gestures;
responsive to concurrently detecting the plurality of parallel gestures in a first area of the touch screen interface:
  selecting a playback speed from a plurality of playback speeds based on the number of the plurality of parallel gestures, the plurality of playback speeds including at least one playback speed corresponding to two parallel gestures and another playback speed corresponding to three parallel gestures;
  causing playback of multimedia content on a multimedia device at the selected playback speed;
  responsive to the plurality of parallel gestures, updating a progress indicator displayed at the remote wireless device to reflect the playback of the multimedia content at the selected playback speed;
responsive to activating the remote wireless device from an inactive state, requesting a progress update for the playback of the multimedia content from the multimedia device, and updating the progress indicator displayed at the remote wireless device to reflect a new playback position of the multimedia content;
responsive to concurrently detecting the plurality of parallel gestures in a second area of the touch screen interface, the second area being different than the first area;
  causing a command selection from a plurality of commands corresponding to a displayed menu of options each having an option number, the selected command corresponding to a menu option having an option number equivalent to the number of the plurality of parallel gestures.

8. The method of claim 7, wherein the plurality of playback speeds comprises two or more fast-forward speeds.

9. The method of claim 7, wherein the multimedia device comprises one or both of: an audio player or a video player.

10. The method of claim 7, further comprising:
calculating a current playback position for the progress indicator based on a previous progress update from the multimedia device and an amount of time elapsed from the previous progress update.

11. The method of claim 7, further comprising determining that the remote wireless device has been activated from the inactive state responsive to input from an accelerometer indicating that the remote wireless device has been picked up.

12. A method, comprising:
concurrently detecting a plurality of parallel gestures on a touch screen interface of a remote wireless device;
determining a number of the plurality of parallel gestures;
responsive to concurrently detecting the plurality of parallel gestures in a first area of the touch screen interface:
  selecting a rewind speed from a plurality of rewind speeds based on the number of the plurality of parallel gestures, the plurality of rewind speeds including at least one rewind speed corresponding to two parallel gestures and another rewind speed corresponding to three parallel gestures;
  causing rewinding of multimedia content on a multimedia device at the selected rewind speed;
  responsive to the plurality of parallel gestures, updating a progress indicator displayed at the remote wireless device to reflect the rewinding of the multimedia content at the selected rewind speed;
responsive to activating the remote wireless device from an inactive state, requesting a progress update for the playback of the multimedia content from the multimedia device, and updating the progress indicator displayed at the remote wireless device to reflect a new playback position of the multimedia content;
responsive to concurrently detecting the plurality of parallel gestures in a second area of the touch screen interface, the second area being different than the first area;
  causing a command selection from a plurality of commands corresponding to a displayed menu of options each having an option number, the selected command corresponding to a menu option having an option number equivalent to the number of the plurality of parallel gestures.

13. One or more non-transitory computer readable media storing instructions, which when executed by one or more computing devices, cause performance of:
concurrently detecting a plurality of parallel gestures on a touch screen interface of a first device;
determining a number of the plurality of parallel gestures;
responsive to concurrently detecting the plurality of parallel gestures in a first area of the touch screen interface:
  selecting a command from a plurality of commands based on the number of the plurality of parallel gestures, the plurality of commands corresponding to a displayed menu of options each having an option number;
  wherein selecting the command comprises selecting which of the plurality of commands corresponds to a particular option, of the displayed menu of options, that has an option number equivalent to the number of parallel gestures, the displayed menu of options including at least one option corresponding to two parallel gestures and another option corresponding to three parallel gestures; and causing performance of the selected command at the first device or at a second device that is communicatively coupled to the first device;

responsive to concurrently detecting the plurality of parallel gestures in a second area of the touch screen interface, the second area being different than the first area:

causing performance of a trick-play command corresponding to the number of the plurality of parallel gestures, with respect to playback of multimedia content at the first device or at the second device that is communicatively coupled to the first device, the trick-play command being different than the plurality of commands corresponding to the menu of options.

14. The one or more non-transitory computer readable media of claim 13, wherein each of the options corresponds to a bookmark in the multimedia content, wherein performance of the selected command comprises playing the multimedia content from a playing position associated with a particular bookmark that corresponds to the particular option.

15. The one or more non-transitory computer readable media of claim 13, wherein the plurality of parallel gestures comprise a plurality of parallel sliding gestures performed in a same direction.

16. The one or more non-transitory computer readable media of claim 13, wherein determining the number of the plurality of parallel gestures comprises determining a number of tap gestures concurrently performed on the touch screen interface.

17. The one or more non-transitory computer readable media of claim 13, wherein causing performance of the selected command comprises causing performance of the selected command at the second device that is communicatively coupled to the first device.

18. One or more non-transitory computer readable media storing instructions, which when executed by one or more computing devices, cause performance of:

concurrently detecting a plurality of parallel gestures on a touch screen interface of a remote wireless device;

determining a number of the plurality of parallel gestures;

responsive to concurrently detecting the plurality of parallel gestures in a first area of the touch screen interface:

selecting a playback speed from a plurality of playback speeds based on the number of the plurality of parallel gestures, the plurality of playback speeds including at least one playback speed corresponding to two parallel gestures and another playback speed corresponding to three parallel gestures;

causing playback of multimedia content on a multimedia device at the selected playback speed;

responsive to the plurality of parallel gestures, updating a progress indicator displayed at the remote wireless device to reflect the playback of the multimedia content at the selected playback speed;

responsive to activating the remote wireless device from an inactive state, requesting a progress update for the playback of the multimedia content from the multimedia device, and updating the progress indicator displayed at the remote wireless device to reflect a new playback position of the multimedia content;

responsive to concurrently detecting the plurality of parallel gestures in a second area of the touch screen interface, the second area being different than the first area:

causing a command selection from a plurality of commands corresponding to a displayed menu of options each having an option number, the selected command corresponding to a menu option having an option number equivalent to the number of the plurality of parallel gestures.

19. The one or more non-transitory computer readable media of claim 18, wherein the plurality of playback speeds comprises two or more fast-forward speeds.

20. The one or more non-transitory computer readable media of claim 18, wherein the multimedia device comprises one or both of: an audio player or a video player.

21. The one or more non-transitory computer readable media of claim 18, wherein the instructions, when executed by the one or more computing devices, further cause performance of:

calculating a current playback position for the progress indicator based on a previous progress update from the multimedia device and an amount of time elapsed from the previous progress update.

22. The one or more non-transitory computer readable media of claim 18, wherein the instructions, when executed by the one or more computing devices, further cause determining that the remote wireless device has been activated from the inactive state responsive to input from an accelerometer indicating that the remote wireless device has been picked up.

23. One or more non-transitory computer readable media storing instructions, which when executed by one or more computing devices, cause performance of:

concurrently detecting a plurality of parallel gestures on a touch screen interface of a remote wireless device;

determining a number of the plurality of parallel gestures;

responsive to concurrently detecting the plurality of parallel gestures in a first area of the touch screen interface:

selecting a rewind speed from a plurality of rewind speeds based on the number of the plurality of parallel gestures, the plurality of rewind speeds including at least one rewind speed corresponding to two parallel gestures and another rewind speed corresponding to three parallel gestures;

causing rewinding of multimedia content on a multimedia device at the selected rewind speed;

responsive to the plurality of parallel gestures, updating a progress indicator displayed at the remote wireless device to reflect the rewinding of the multimedia content at the selected rewind speed;

responsive to activating the remote wireless device from an inactive state, requesting a progress update for the playback of the multimedia content from the multimedia device, and updating the progress indicator displayed at the remote wireless device to reflect a new playback position of the multimedia content;

responsive to concurrently detecting the plurality of parallel gestures in a second area of the touch screen interface, the second area being different than the first area:

causing a command selection from a plurality of commands corresponding to a displayed menu of options each having an option number, the selected command corresponding to a menu option having an option number equivalent to the number of the plurality of parallel gestures.

24. A first device comprising:
one or more processors;
logic, implemented at least partly by hardware, configured to concurrently detect a plurality of parallel gestures on a touch screen interface of the first device;
logic, implemented at least partly by hardware, configured to determine a number of the plurality of parallel gestures;
logic, implemented at least partly by hardware, configured to, responsive to concurrently detecting the plurality of parallel gestures in a first area of the touch screen interface:
   selecting a command from a plurality of commands based on the number of the plurality of parallel gestures, the plurality of commands corresponding to a displayed menu of options each having an option number;
   wherein selecting the command comprises selecting which of the plurality of commands corresponds to a particular option, of the displayed menu of options, that has an option number equivalent to the number of parallel gestures, the displayed menu of options including at least one option corresponding to two parallel gestures and another option corresponding to three parallel gestures; and
   causing performance of the selected command at the first device or at a second device that is communicatively coupled to the first device;
logic, implemented at least partly by hardware, configured to, responsive to concurrently detecting the plurality of parallel gestures in a second area of the touch screen interface, the second area being different than the first area:
   cause performance of a trick-play command corresponding to the number of the plurality of parallel gestures, with respect to playback of multimedia content at the first device or at the second device that is communicatively coupled to the first device, the trick-play command being different than the plurality of commands corresponding to the menu of options.

25. The first device of claim 24, wherein each of the options corresponds to a bookmark in the multimedia content, wherein performance of the selected command comprises playing the multimedia content from a playing position associated with a particular bookmark that corresponds to the particular option.

26. The first device of claim 24, wherein the plurality of parallel gestures comprise a plurality of parallel sliding gestures performed in a same direction.

27. The first device of claim 24, wherein determining the number of the plurality of parallel gestures comprises determining a number of tap gestures concurrently performed on the touch screen interface.

28. The first device of claim 24, wherein causing performance of the selected command comprises causing performance of the selected command at the second device that is communicatively coupled to the first device.

29. A remote wireless device, comprising:
one or more processors;
logic, implemented at least partly by hardware, configured to concurrently detect a plurality of parallel gestures on a touch screen interface of the remote wireless device;
logic, implemented at least partly by hardware, configured to determine a number of the plurality of parallel gestures;
logic, implemented at least partly by hardware, configured to, responsive to concurrently detecting the plurality of parallel gestures in a first area of the touch screen interface:
   select a playback speed from a plurality of playback speeds based on the number of the plurality of parallel gestures, the plurality of playback speeds including at least one playback speed corresponding to two parallel gestures and another playback speed corresponding to are three parallel gestures;
   cause playback of multimedia content on a multimedia device at the selected playback speed;
   responsive to the plurality of parallel gestures, update a progress indicator displayed at the remote wireless device to reflect the playback of the multimedia content at the selected playback speed;
logic, implemented at least partly by hardware, configured to, responsive to activating the remote wireless device from an inactive state, request a progress update for the playback of the multimedia content from the multimedia device, and update the progress indicator displayed at the remote wireless device to reflect a new playback position of the multimedia content;
logic, implemented at least partly by hardware, configured to, responsive to concurrently detecting the plurality of parallel gestures in a second area of the touch screen interface, the second area being different than the first area:
   cause a command selection from a plurality of commands corresponding to a displayed menu of options each having an option number, the selected command corresponding to a menu option having an option number equivalent to the number of the plurality of parallel gestures.

30. The remote wireless device of claim 29, wherein the plurality of playback speeds comprises two or more fast-forward speeds.

31. The remote wireless device of claim 29, wherein the multimedia device comprises one or both of: an audio player or a video player.

32. The remote wireless device of claim 29, further comprising logic, implemented at least partly by hardware, configured to:
calculating a current playback position for the progress indicator based on a previous progress update from the multimedia device and an amount of time elapsed from the previous progress update.

33. The remote wireless device of claim 29, further comprising logic configured to determine that the remote wireless device has been activated from the inactive state responsive to input from an accelerometer indicating that the remote wireless device has been picked up.

34. A remote wireless device, comprising:
one or more processors;
logic, implemented at least partly by hardware, configured to concurrently detect a plurality of parallel gestures on a touch screen interface of the remote wireless device;
logic, implemented at least partly by hardware, configured to determine a number of the plurality of parallel gestures;
logic, implemented at least partly by hardware, configured to, responsive to concurrently detecting the plurality of parallel gestures in a first area of the touch screen interface:
   select a rewind speed from a plurality of rewind speeds based on the number of the plurality of parallel gestures, the plurality of rewind speeds including at least one rewind speed corresponding to two parallel gestures and another rewind speed corresponding to three parallel gestures;
cause rewinding of multimedia content on a multimedia device at the selected rewind speed;
responsive to the plurality of parallel gestures, update a progress indicator displayed at the remote wireless device to reflect the rewinding of the multimedia content at the selected rewind speed;

logic, implemented at least partly by hardware, configured to, responsive to activating the remote wireless device from an inactive state, requesting a progress update for the playback of the multimedia content from the multimedia device, and updating the progress indicator displayed at the remote wireless device to reflect a new playback position of the multimedia content;

logic, implemented at least partly by hardware, configured to, responsive to concurrently detecting the plurality of parallel gestures in a second area of the touch screen interface, the second area being different than the first area:
cause a command selection from a plurality of commands corresponding to a displayed menu of options each having an option number, the selected command corresponding to a menu option having an option number equivalent to the number of the plurality of parallel gestures.

* * * * *